(12) United States Patent
Ramkumar et al.

(10) Patent No.: US 12,346,346 B2
(45) Date of Patent: Jul. 1, 2025

(54) NATURAL LANGUAGE PROCESSING AND MACHINE-LEARNING FOR EVENT IMPACT ANALYSIS

(71) Applicant: REFINITIV US ORGANIZATION LLC, New York, NY (US)

(72) Inventors: Nitish Ramkumar, Sinagpore (SG); Joseph Whyte, Singapore (SG); Ben Chu, Singapore (SG); Jason Chan, Singapore (SG); Swarnima Sircar, Singapore (SG); Kelvin Rocha, Singapore (SG); Regan Tuck, Singapore (SG); Alena Melnikova, Singapore (SG)

(73) Assignee: REFINITIV US ORGANIZATION LLC, New York, NY (US)

( * ) Notice: Subject to any disclaimer, the term of this patent is extended or adjusted under 35 U.S.C. 154(b) by 271 days.

(21) Appl. No.: 17/738,742

(22) Filed: May 6, 2022

(65) Prior Publication Data

US 2022/0358150 A1 Nov. 10, 2022

Related U.S. Application Data (60) Provisional application No. 63/185,491, filed on May 7, 2021.

(51) Int. Cl.
*G06F 40/35* (2020.01)
*G06F 16/2455* (2019.01)
(Continued)

(52) U.S. Cl.
CPC ...... *G06F 16/285* (2019.01); *G06F 16/24564* (2019.01); *G06F 40/49* (2020.01)

(58) Field of Classification Search
CPC ...... G06F 16/35; G06F 16/353; G06F 16/355; G06F 40/279; G06F 40/30; G06F 40/35; G06F 16/24564; G06Q 10/06375
(Continued)

(56) References Cited

U.S. PATENT DOCUMENTS 6,092,059 A * 7/2000 Straforini ............. G06F 18/254
706/14
6,487,539 B1 * 11/2002 Aggarwal .......... G06Q 30/0224
705/14.23
(Continued)

OTHER PUBLICATIONS

International Search Report and Written Opinion dated Jul. 27, 2022, issued in the corresponding International Application No. PCT/IB2022/054190, filed May 6, 2022, pp. 1-13.

*Primary Examiner* — Martin Lerner
(74) *Attorney, Agent, or Firm* — Pillsbury Winthrop Shaw Pittman, LLP (57) ABSTRACT

Systems and methods may use natural language processing (NLP) and machine-learning techniques to detect an impact that an event will have on a domain-specific topic. For example, the system may use multi-stage cleaning using a rules-based and an artificial intelligence (AI)-based filter to filter large quantities of event items that may not be relevant to a domain of interest. The AI-based filter may be trained using labeled event items that were previously known to be impactful. The system may cluster the cleaned event items to group similar event items and eliminate redundancy. The system may then predict and quantify the impact that events described by clustered event items will have on the domain-specific topic. Such prediction may be based on a classifier trained using various model features that correlate with impactful events, including prior similar events.

19 Claims, 8 Drawing Sheets

(51) Int. Cl.
*G06F 16/28* (2019.01)
*G06F 40/49* (2020.01)

(58) Field of Classification Search
USPC .............. 704/1, 9; 706/12, 21; 707/731, 754
See application file for complete search history.

(56) References Cited

U.S. PATENT DOCUMENTS

| | | | | |
|---|---|---|---|---|
| 10,109,023 | B2* | 10/2018 | Shah | G06F 16/9535 |
| 10,638,298 | B1* | 4/2020 | Di Domenico | G06N 20/00 |
| 11,521,714 | B1* | 12/2022 | Jain | G06F 40/289 |
| 11,544,124 | B1* | 1/2023 | Degioanni | G06F 9/44526 |
| 2004/0143659 | A1* | 7/2004 | Milliken | H04L 67/535 |
| | | | | 709/224 |
| 2008/0270116 | A1* | 10/2008 | Godbole | G06F 40/35 |
| | | | | 704/9 |
| 2011/0087486 | A1* | 4/2011 | Schiller | G06F 40/166 |
| | | | | 704/9 |
| 2012/0079020 | A1* | 3/2012 | Park | H04L 51/52 |
| | | | | 709/204 |
| 2012/0316916 | A1 | 12/2012 | Andrews et al. | |
| 2016/0371132 | A1* | 12/2016 | Prabhakara | G06F 11/0793 |
| 2018/0300041 | A1* | 10/2018 | Tilikin | G06F 16/9024 |
| 2019/0005012 | A1* | 1/2019 | Priestas | G06N 20/00 |
| 2019/0012374 | A1 | 1/2019 | Petroni et al. | |
| 2019/0034829 | A1* | 1/2019 | Guim Bernat | G06N 20/00 |
| 2019/0043500 | A1* | 2/2019 | Malik | G06F 40/253 |
| 2019/0089656 | A1* | 3/2019 | Johnson, Jr. | G06F 40/30 |
| 2019/0349333 | A1* | 11/2019 | Pickover | G06N 20/00 |
| 2020/0117742 | A1* | 4/2020 | Huang | G06F 16/24564 |
| 2020/0364300 | A1* | 11/2020 | Tan | G06F 40/30 |
| 2020/0410010 | A1* | 12/2020 | Bar-Haim | G06F 40/284 |
| 2021/0081477 | A1* | 3/2021 | Tibbet | G06F 16/2465 |
| 2021/0109954 | A1 | 4/2021 | Wang et al. | |
| 2021/0350258 | A1* | 11/2021 | Divakarmurthy | G06F 40/279 |
| 2022/0030015 | A1* | 1/2022 | Piedrahita Herran | G06F 16/93 |
| 2022/0180050 | A1* | 6/2022 | Rabines | G06F 40/186 |

\* cited by examiner

Access a plurality of event items, each event item, from among the plurality of event items, comprising content that describes a corresponding event
502

Filter the plurality of event items via a rules-based filter that uses one or more domain-specific rules
504

Filter an output of the rules-based filter via an AI-based filter trained via machine-learning on a training corpus comprising event items that are labelled as relating to the domain
506

Determine that a subset of event items, from among the plurality of event items, relate to the domain based on the rules-based filter and the AI-based filter
508

Determine that two or more event items, from among the subset of event items, both commonly describe an event based on content similarity among the two or more event items
510

Predict that the event commonly described by the two or more event items will have an impact on the domain-specific topic
512

NATURAL LANGUAGE PROCESSING AND MACHINE-LEARNING FOR EVENT IMPACT ANALYSIS

RELATED APPLICATIONS

This application claims priority to U.S. Provisional Patent Application No. 63/185,491, filed on May 7, 2021 the content of which is incorporated by reference in its entirety herein.

BACKGROUND

Events may be conveyed from multiple event sources through a communication network. In some instances, multiple event sources will convey the same event through their own event items. For example, a news source may report on an event through its news story while another news source may report on the same event through its own news story. Events may be conveyed through various types of content such as unstructured text, structured text, graphics, and/or other types of content. Thus, events may be conveyed from various event sources, relate to one or more domains from among multiple domains, and include various types of content.

Oftentimes events will have a quantifiable impact on a domain-specific topic of interest. A domain-specific topic may refer to subject matter that is related to a particular domain, which refers to an overall subject matter area. For example, a news story may have an impact on an exchange rate (also referred to as "price") of a currency pair, a stock price of an equity, an approval rating of a political candidate, and so forth. However, due to the number of different event sources, proliferation in event reporting, unstructured text, duplication in reporting, and other issues, measuring such impacts may be computationally difficult.

SUMMARY

The disclosure relates to systems, methods, and computer-readable media for computationally learning to predict the impact of events on domain-specific topics using natural language processing. Computational learning systems may apply artificial intelligence techniques to learn from datasets through machine learning. These systems may use training corpuses to train a computer system to learn from the training corpus. This training may be used to develop computational models that fit the training corpus and facilitate predictions on real-world data. However, computationally learning from events may present challenges due to the scale, variability in the ways event data is communicated, and unstructured content such as natural language text In many instances, the event data may have an impact on a quantifiable aspect of the domain. However, the variability in the types of content, domain, and sources of the event data, and/or other issues present challenges in computationally determining such impact. The foregoing may create excessive noise for artificial intelligence ("AI") and machine learning systems, making computational learning difficult, inefficient and inaccurate.

The systems, methods, and computer-readable media disclosed herein may clean the event items for more efficient learning. For example, a system may use a rules-based filter to clean event items in a way that reduces the number of event items that must be processed. The system may further (or instead) use an AI-based filter that uses a computational model trained to identify event items relating to the domain of interest. The AI-based filter may use word embeddings that may be used to compare a current event item being assessed with the word embeddings of prior event items known to be relevant to the domain of interest. Thus, the system may reduce noise for computational learning systems that identify and quantify impactful events.

To address redundancy in the event items, the system may cluster the event items so that event items that relate to the same event may be clustered together. Such clustering may be based on the similarity between text content, such as through word embedding similarity and/or other natural language text similarity metrics. The word embeddings may also, in some instances, be reused from the AI-based filter, which may further improve computational efficiency. In this way, computational learning systems may efficiently learn to assess the impact of events on domain-specific topics without the noise and redundancy of multiple event items conveying the same event.

Once the system has identified and clustered event items that are relevant to a domain of interest, the system may classify whether or not an event is impactful to a domain-specific topic of interest. For example, the system may apply real-time analysis of data compared to prior events known to have impacted the domain-specific topic of interest. In some of these examples, the system may apply an impact classifier trained to identify which events previously impacted the domain-specific topic of interest based on model features correlated to such impact. Furthermore, the system may apply time series of data to predict the impact over time after an event occurs.

BRIEF DESCRIPTION OF THE DRAWINGS

Features of the present disclosure may be illustrated by way of example and not limited in the following Figure(s), in which like numerals indicate like elements, in which.

DETAILED DESCRIPTION

Figure 1:
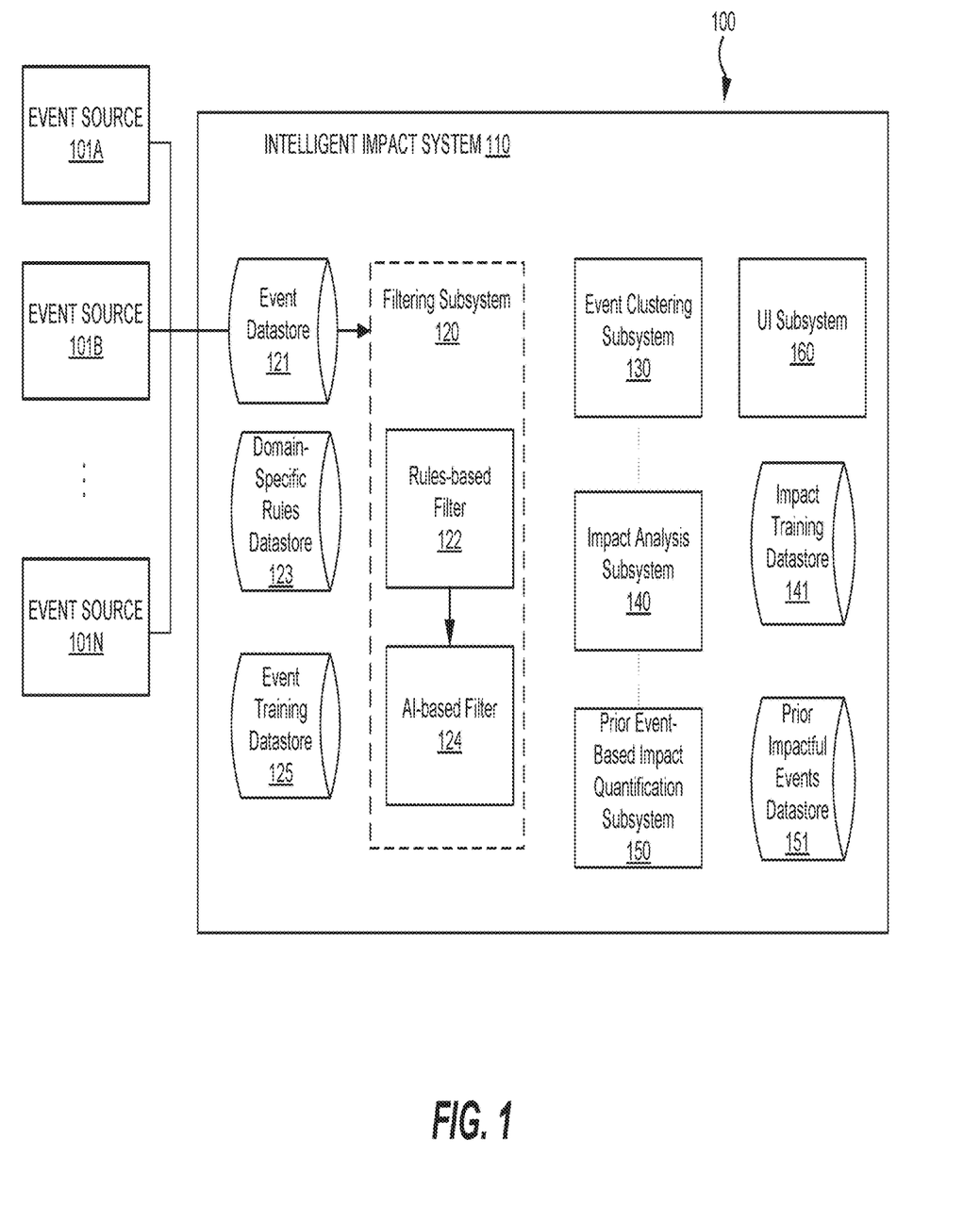
FIG. 1 illustrates an example of a computer environment for computationally learning from historical impact events using artificial intelligence (AI)-based models using machine learning and natural language processing to detect and quantify impactful events in real-time.

FIG. 1 illustrates an example of a computer environment 100 for computationally learning from historical impact events using artificial intelligence (AI)-based models using machine learning and natural language processing to detect and quantify impactful events in real-time. The computer environment 100 may include a plurality of event sources 101 (illustrated as event sources 101A . . . N), an intelligent impact computer system 110, and/or other features. The intelligent impact computer system 110 may receive event items from one or more event sources 101 and may store the event items in an event datastore 121. An event item may refer to data transmitted via a network that describes an event. The event item may be received in various formats. For example, an event item may be received as a hypertext markup language (HTML) webpage. The data in an event item may include various type of content such as unstructured text (natural language text), structured text, audio content, graphical content such as images or videos, and/or other content that describes the event. Examples of events include a breaking or current news event.

An event source 101 may be a computer system that transmits event items via a communication network (not shown). Examples of event sources 101 include computers of traditional news outlets, social media platforms, and/or other sources of event items. Multiple event sources 101 may each provide an event item that describes the same event. For example, different news platforms may provide their own news stories relating to the same current event, resulting in duplicative event items because these event items describe the same current event.

Events may have various domain-specific and/or sub-domain-specific impacts. For example, a news story relating to a geopolitical conflict may have an impact on a financial domain and, in particular, to a sub-domain of foreign exchange markets. In another example, a news story relating to a political candidate may have an impact on a political domain and, in particular, to a sub-domain of voter sentiment.

Because of the scale, unstructured content, variability in relevance to different domains (a news story about an athlete may not have any relevance or impact on an equity share price), and/or duplicative nature of event items, it may be computationally difficult to determine whether a given event item will impact a given domain or sub-domain and what such impact will be.

The intelligent impact computer system 110 may include improvements that address these and other challenges of computationally determining whether or not event items will be relevant to and impact a given domain-specific topic, and may further include improvements that quantify such impact. "Impact" and "impactful" may refer to a change in a quantitative value of a domain-specific topic of interest above a threshold value and within a predefined time period. For example, if a change in a quantitative value of a domain-specific topic that is higher than the threshold value may be observed within ten seconds of the occurrence or reporting of an event, then the event will be deemed to be impactful to the domain-specific topic of interest.

A domain-specific topic may refer to subject matter that has a quantifiable aspect that can be measured and relates to a particular domain. For example, in a finance domain, a domain-specific topic may include a currency pair that has a quantifiable aspect such as an exchange rate (also referred to as a price) between the currency pair. In this example, the intelligent impact computer system 110 may determine an impact of events such as news events on the currency pair based on changes in the exchange rate. In another example, in a political domain, a domain-specific topic may include a political figure that has a quantifiable aspect such as an approval rating. In this example, the intelligent impact computer system 110 may determine an impact of events on the political figure based on changes in the approval rating. Other types of impacts on different types of domain-specific may be determined as well or instead.

The intelligent impact computer system 110 may include a filtering subsystem 120, an event clustering subsystem 130, an impact analysis subsystem 140, a prior event-based impact quantification subsystem 150, a UI subsystem 160, and/or other features.

The filtering subsystem 120, the event clustering subsystem 130, the impact analysis subsystem 140, the prior event-based impact quantification subsystem 150, the UI subsystem 160 may each be implemented as instructions that program a processor of the intelligent impact computer system 110. Alternatively, or additionally, the filtering subsystem 120, the event clustering subsystem 130, the impact analysis subsystem 140, the prior event-based impact quantification subsystem 150, the UI subsystem 160 may each be implemented in hardware.

The filtering subsystem 120 may clean event items received from event sources 101 based on their relevance to a particular domain. The filtering subsystem 120 may do so using a rules-based filter 122 and/or an AI-based filter 124. The rules-based filter 122 may apply explicit cleaning using domain-specific rules, which may be stored in the domain-specific rules datastore 123. The AI-based filter 124 may use a model trained to identify event items that are relevant to a domain of interest. For example, the model may be trained using training data from an event training datastore 125, which may include annotated data that includes a label indicating prior events that were relevant to the domain of interest.

Based on the cleaning (also referred to as filtering) by the filtering subsystem 120, event items that are not relevant to specific domains or sub-domains (hereinafter, simply "domains" for simplicity but will be understood to include sub-domains) of interest may be filtered in or out, reducing noise for impact classification. Put another way, the filtering subsystem 120 may identify event items from event sources 101 that are likely to be relevant to a specific domain or sub-domain. For example, event items may be filtered specifically for financial domains if the intelligent impact computer system 110 is to identify the impact of event items on financial domains. Likewise, event items may be filtered specifically for political domains if the intelligent impact computer system 110 is to identify the impact of event items on political domains.

Oftentimes, two or more event items will describe a similar or same event. For example, there may be many news articles (from the same or different event sources 101) reporting on the same political event. In these examples, the event items may be duplicative and result in improper impact determination by the impact analysis subsystem 140. This problem may arise because, for example, the machine-learning models used by the impact analysis subsystem 140 may be trained to classify the impact of an event on a domain-specific topic rather than the impact of event items on the domain-specific topic.

To address the problem of duplication, the event clustering subsystem 130 may cluster event items (before and/or after filtering by the filtering subsystem 120) based on the content of the event items. For example, the event clustering subsystem 130 may cluster two or more event items that have similar content to one another. The event clustering subsystem 130 may store a data structure configured to store a cluster count that indicates a number of event items that were clustered. Accordingly, the cluster count refers to a number of event items that the event clustering subsystem 130 determined relate to the same event. Additional examples and details of the filtering subsystem 120 and the event clustering subsystem 130 will be described with reference to FIG. 2.

The impact analysis subsystem 140 may determine whether an event described by one or more event items will have an impact on a domain-specific topic. For example, after event items have been cleaned by the filtering subsystem 120 and/or clustered by the event clustering subsystem 130, the impact analysis subsystem 140 may determine whether an event described by the filtered and/or clustered event items will impact a domain-specific topic. In some examples, the impact analysis subsystem 140 may determine whether an event will have an impact on a domain-specific topic using a model trained to predict such impact. For example, the model may be trained on training data from an impact training datastore 141 which may include model features that describe event items correlated with impacts by those event items.

The prior event-based impact quantification subsystem 150 may computationally model prior events known to have impacted a domain-specific topic. For example, the prior event-based impact quantification subsystem 150 may access data from the prior impactful events datastore 151, which stores time series of impacts on domain-specific topics of interest to quantify event impacts. The time series may, for example, store the historical price movement of a currency pair over time after a prior event. In this way, the time series may be used as a baseline to predict the impact of future, similar, events. Additional examples and details of the impact analysis subsystem 140 and the prior event-based impact quantification subsystem 150 will be described with reference to FIG. 3.

The UI subsystem 160 may generate interfaces for displaying impact analysis data. The UI subsystem 160 may compute data and generate interfaces for market behavior trends, smart aggregation data, impact charts, and/or other displays. For example, the market behavior interface may provide volatility of currency pair, volume (matching traded volume), spread (top of the book spread from matching—this price source may change), and/or metrics.

In some examples, the UI subsystem 160 may perform smart aggregation that aggregates past events. To do so, the UI subsystem 160 may compute the median of all the past events selected and identify a similarity score of the past price, similar events spread, volume and volatility so that a user can identify which past events to compare the current event to.

Figure 6A:
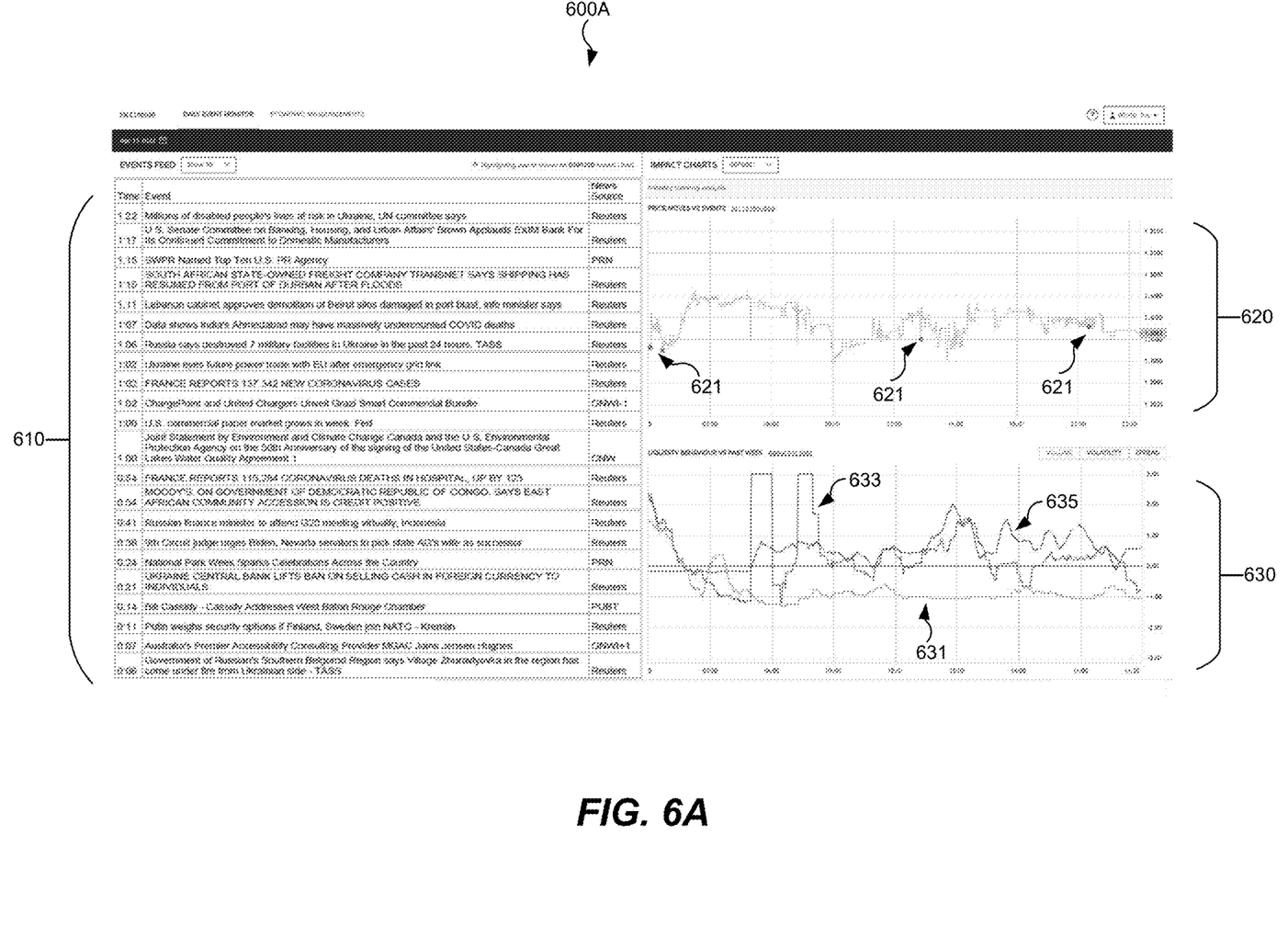
FIG. 6A illustrates an example of a user interface for displaying event impacts.
Figure 6B:
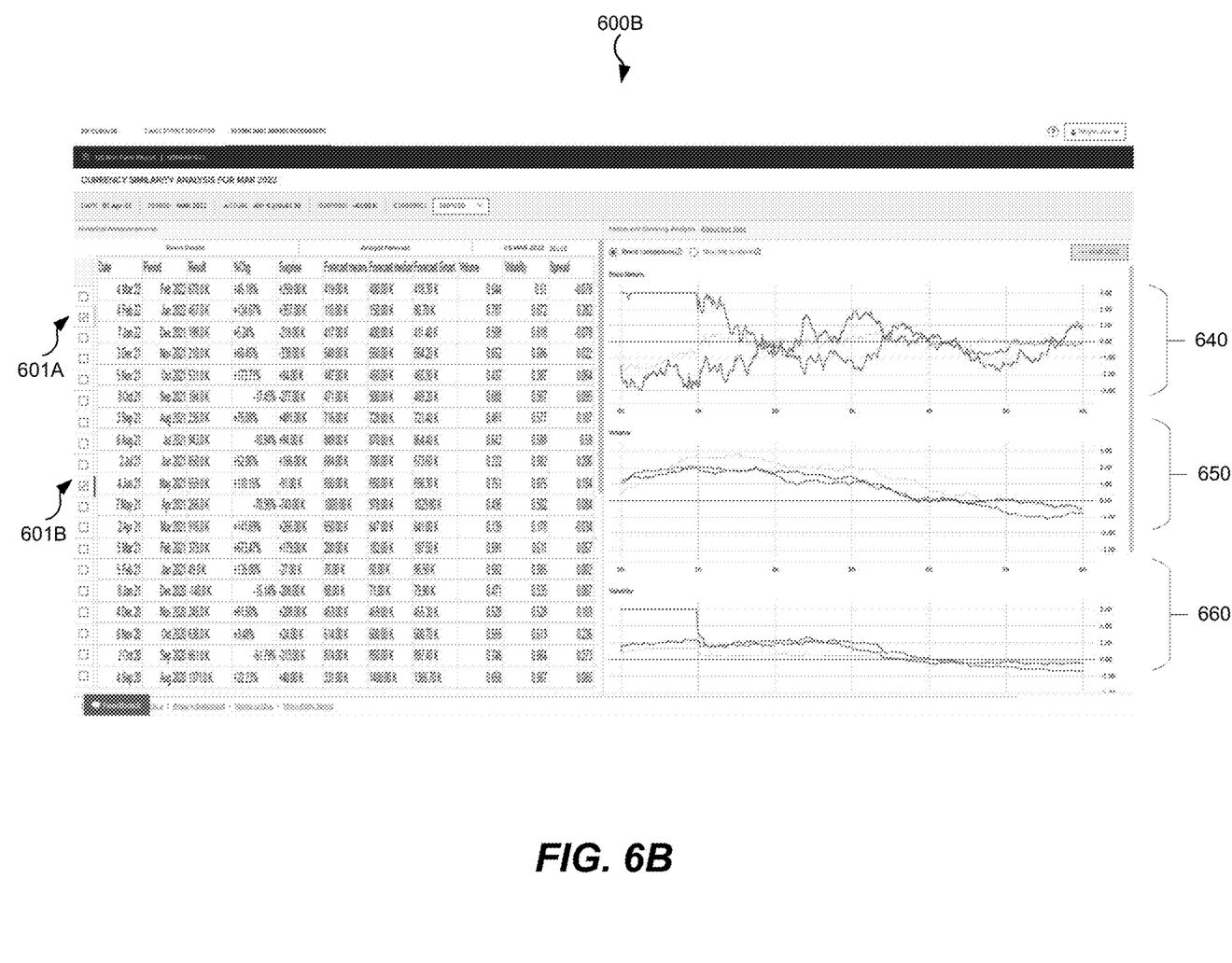
FIG. 6B illustrates another example of a user interface for displaying event impacts.

In some examples, the UI subsystem 160 may generate impact charts for which a user may select a currency to analyze the impact of events such as news and economic announcements and commodity price moves on price, volume, volatility and spread. Other types of charts and displays may be generated for other types of events other than foreign exchange examples. In any of the foregoing interfaces, a link to the event(s) that were impactful may be displayed. Examples of interfaces are illustrated in FIGS. 6A and 6B.

Filtering and Clustering Event Items

Figure 2:
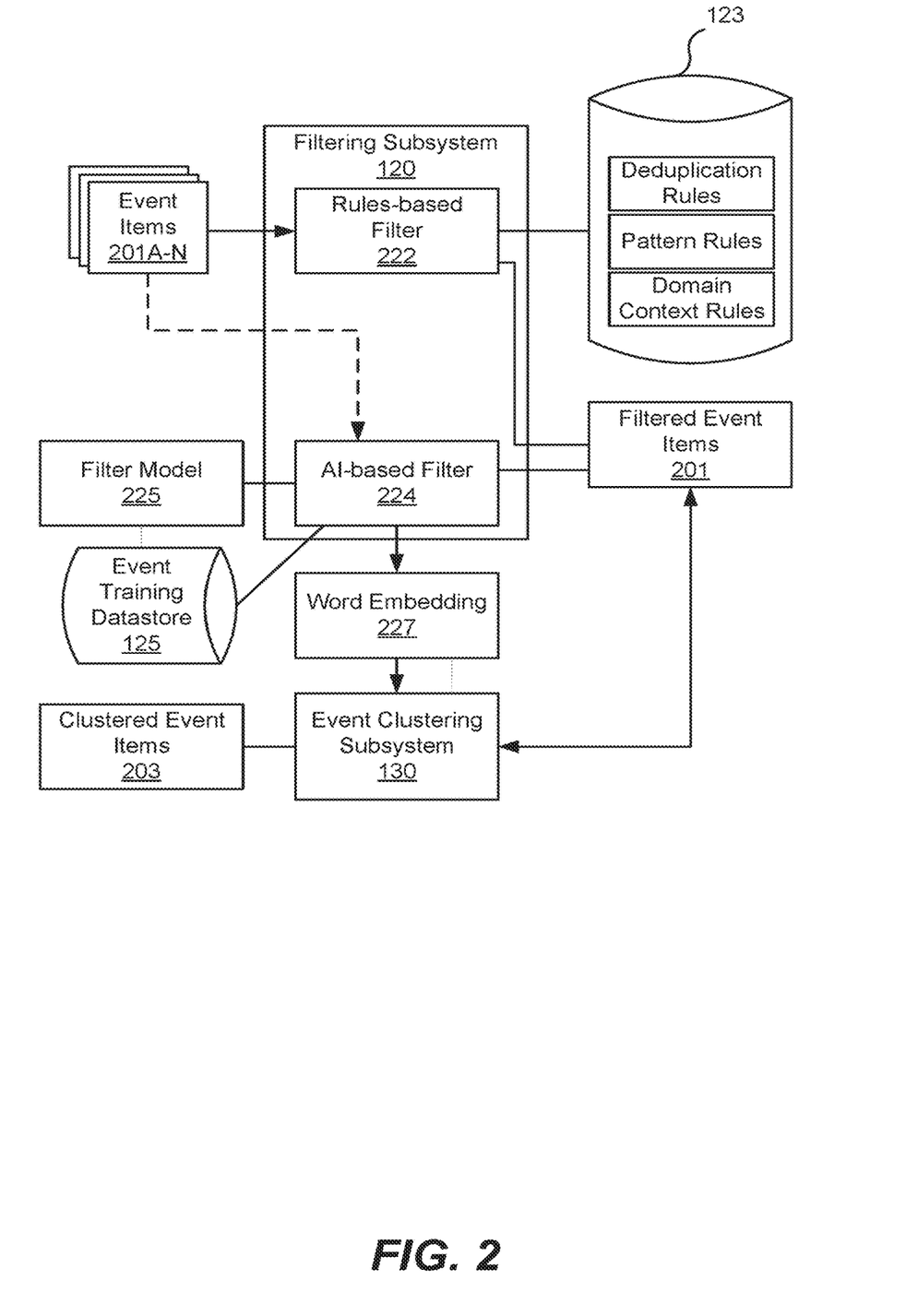
FIG. 2 illustrates an example of filtering and clustering event items in the intelligent impact system.

FIG. 2 illustrates an example of filtering and clustering event items in the intelligent impact computer system 110. The filtering subsystem 120 may access and filter (in or out) event items 201 based on a rules-based filter 222 and/or an AI-based filter 224.

Rules-Based Filtering

The rules-based filter 222 may evaluate one or more domain-specific rules against the event items to identify event items (illustrated as filtered event items 201) that may be relevant to a given domain. The domain-specific rules may be stored in the rules datastore 123 and may be configured to identify content in event items that is relevant to a particular domain.

The domain-specific rules may include a deduplication rule, a pattern rule, and a domain context rule. The deduplication rule specifies that literal duplicated event items (event items that were previously processed by the filtering subsystem 120) are to be removed. The pattern rule may include a parameter that specifies a tag value, a keyword/phrase, or other portions of content to filter in or out. The domain context rule may specify that certain domains be filtered in or out.

For example, some event items may include metadata tags that indicate a subject matter of the content in the event items. In this example, a pattern rule may specify the tag and the rules-based filter 222 may evaluate the pattern rule to identify event items having metadata that matches the tag.

To illustrate, a first event item may include a tag "pro tennis." The rules-based filter 222 may extract the tag from the event item (such as a tag from an HTML document or other document that includes the tag) and determine that the content in the first event item relates to sports based on the extracted tag. If the rules-based filter 222 is configured to identify event items relating to sports (based on the domain context rule), the rules-based filter 222 may not filter out the event item. On the other hand, if the rules-based filter 222 is configured to identify event items relating to finance, the rules-based filter 222 may filter out the event item. Other domain-specific rules may identify keywords or phrases that, when found in the content of an event item, indicates that the event item may be relevant to a corresponding domain. For example, the rules-based filter 222 may evaluate a rule that includes a keyword and parse the content to determine whether the content includes the keyword. Still other types of filtering rules may be specified by the domain-specific rules. For example, domain-specific rules may alternatively or additionally specify that event items from certain event sources 101 are to be filtered in or out depending on the domain of interest. For example, if sports content is to be identified, the rules-based filter 222 may filter out event items from an event source 101 that is a business news provider and identify event items from another event source 101 that provides sports news.

AI-Based Filtering

The AI-based filter 224 may be trained to identify event items (illustrated as filtered event items 201) for specific domains based on a filter model 225 that is trained on a training corpus via machine-learning techniques. The training corpus may be stored in the event training datastore 125 and may include annotated data that indicates that certain event items in the training corpus are relevant to a domain of interest. For example, an AI-based filter 224 that identifies event items that are relevant to a finance domain may be trained via a training corpus that includes event items that have been annotated with a label indicating that the event items are relevant to a finance domain. The training corpus may be annotated with the label by a subject matter expert or other user.

In some examples, the AI-based filter 224 may generate an embedding space based on content from the training corpus. For example, the AI-based filter 224 may generate a word embedding 227 based on text from the training corpus. The AI-based filter 224 may correlate the word embeddings 227 with the labeled data, which indicates that the content of event items in the training corpus are relevant to a domain of interest.

A word embedding 227 refers to a computationally-learned representation of individual words or terms, processable by the intelligent impact computer system 110, from the training corpus or other dataset having event items known to be relevant to a domain of interest. Machine learning models, and in particular natural language processing models, may be used to generate word embeddings for text tokens. Some example machine learning models that may be used to generate word embeddings, include, but are not limited to, (which is not to imply that other lists are limiting), Word2Vec, Continuous Bag-of-Words (CBOW) model, Continuous Skip-Gram Model, Global Vectors for Word Representations (GloVe) model, Latent Semantic Analysis (LSA), Bidirectional Encoder Representations from Transformers (BERT), or other machine learning models.

The machine learning model may generate a vector representation (such as a feature vector) of a given text token based on the resolved entity, the POS, other text tokens in the sentence, other text tokens in the section, or other information. Each feature vector may be N-dimensions in size, where each dimension refers to a feature of the word. The number of dimensions of the feature vector may be defined by the machine learning model. In some examples, the number of dimensions of the feature vector may depend on a given domain with which the document is determined to relate. For example, if a given document is determined to relate to a first domain, where entity taxonomy stores N entities specific to the first domain, then a feature vector generated to represent the document may include N-dimensions, each related to a respective entity. For instance, a feature space for the feature vectors generated by the machine learning model may include 50 or more dimensions, 100 or more dimensions, 1,000 or more dimensions, or more.

A word embedding 227 may likewise be generated based on content from an event item and that word embedding 227 may be compared to the word embeddings 227 generated from the training corpus. Based on the comparison, a similarity metric between the compared word embeddings may be generated to determine whether an event item has content that is similar to content previously deemed to be relevant to a domain of interest (or domain-specific topic of interest). The similarity metric may include a cosine similarity metric or other metric for determining the similarity of text based on word embeddings.

Other training corpuses may be similarly used to train an AI-based filter 224 to identify event items relevant to other domains. In some examples, a respective AI-based filter 224 may be trained for each domain-specific topic. For example, a first AI-based filter 224 may be trained for a first currency pair and a second AI-based filter 224 may be trained for a second (different than the first) currency pair.

In some examples, the rules-based filter 222 may filter the event items without filtering by the AI-based filter 224. In other examples, the AI-based filter 224 may filter the event items without filtering by the rules-based filter 222. In yet other examples, the rules-based filter 222 may filter the event items and these filtered event items may be further filtered by the AI-based filter 224 (or vice versa). It should be noted that certain event items may not have tags, in which case the AI-based filter 224 may still be able to identify event items that may be relevant to a domain of interest.

The event clustering subsystem 130 may cluster event items (before and/or after filtering by the filtering subsystem 120) based on word embeddings, which may be the word embeddings 227 generated by the AI-based filter 224, to generate clustered event items 203. For example, the event clustering subsystem 130 may cluster two or more event items when their word embeddings 227 are similar to one another within a threshold value.

When event items have been filtered and/or clustered to reduce noise, the intelligent impact computer system 110 may identify which ones of the filtered and/or clustered event items are likely to have an impact on a domain-specific topic of interest.

Classifying Events and Quantifying Their Impact

Figure 3:
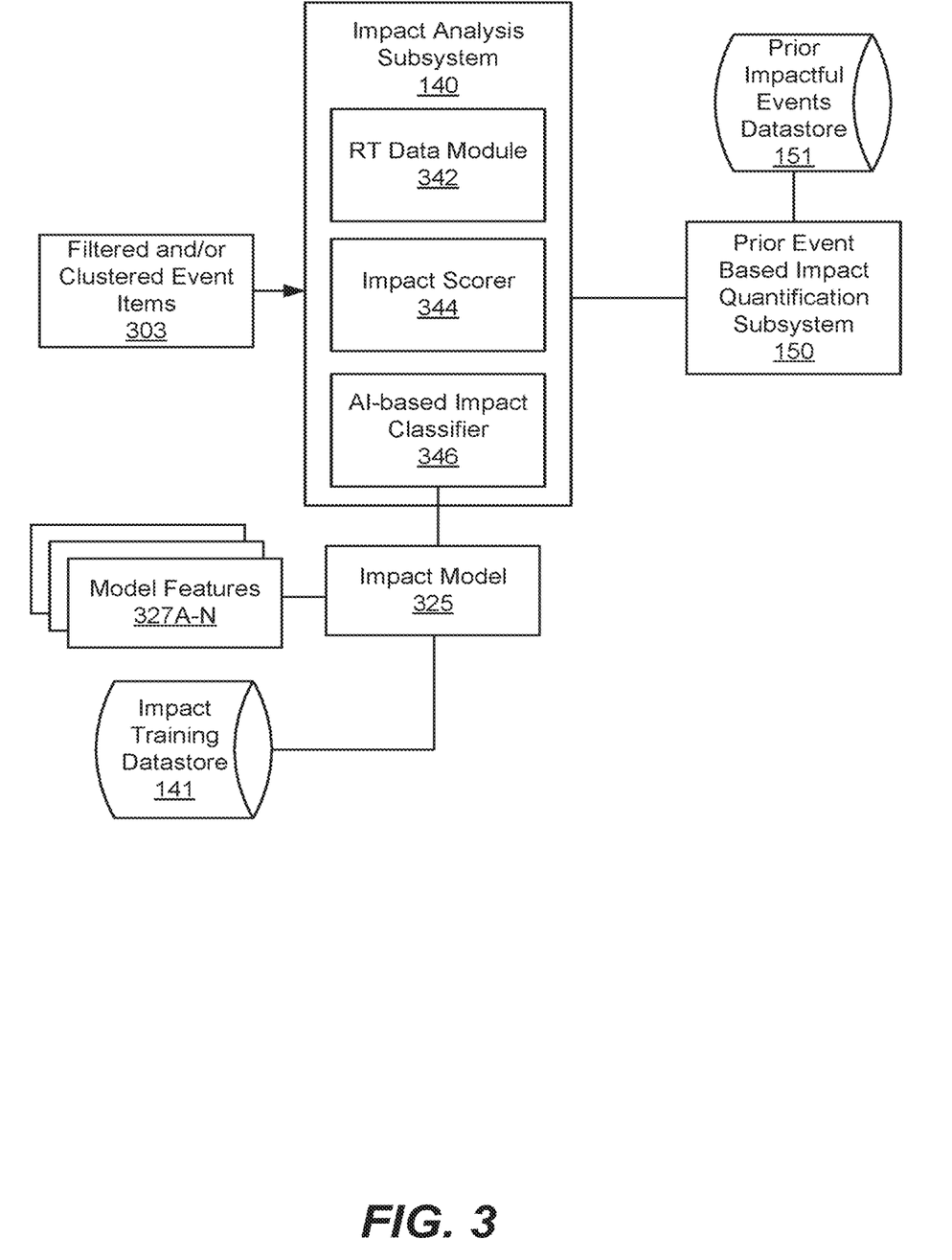
FIG. 3 illustrates an example of classifying event items and quantifying impact of events described by event items in the intelligent impact system.

FIG. 3 illustrates an example of classifying event items and quantifying impact of events described by the event items in the intelligent impact computer system 110. The impact analysis subsystem 140 may determine whether events will have an impact on a domain-specific topic based on corresponding filtered and/or clustered event items 303 (such as filtered event items 201 and/or clustered event items 203 illustrated in FIG. 2). To do so, the impact analysis subsystem 140 may include a real-time (RT) data module 342, an impact scorer 344, an AI-based impact classifier 346, and/or other features.

The RT data module 342 may use real-time analysis of data to determine whether an event had an impact on the domain-specific topic. The real-time analysis may include one or more checks on real-time data to determine whether the event had an impact on the domain-specific topic based on a comparison to one or more real-time data threshold checks. For example, the RT data module 342 may include a cluster size threshold check that specifies a minimum cluster size (requires a minimum number of event items that describe the same event), a quantitative value threshold check (requires a minimum movement in the quantitative value such as a minimum price movement in an exchange rate between a currency pair), and/or other checks on real-time data relating to the domain-specific topic.

The cluster size threshold check may compare the cluster count of a cluster of event items that describe the event with a cluster size threshold. For example, a greater number of news stories presented in real-time (such as being a current news story) about an event may indicate interest in the event and therefore greater likelihood that the event presented in the news stories will impact the domain-specific topic. The cluster size threshold may be set to three, although other values may be used.

The quantitative value threshold check may compare a real-time quantitative value associated with the domain-specific topic with a quantitative value threshold. The movement (up or down) of the real-time quantitative value may indicate that the domain-specific topic has been impacted by an event. In an example in which the domain-specific topic is a currency pair, a quantitative value for the currency pair may include an exchange rate between the currency pair. In this example, a large price movement in the exchange rate may indicate that an event had high impact on the currency pair. In an example in which the domain-specific topic is a political figure, a quantitative value for the political figure may include an approval rating. In this example, a large change in the approval rating may indicate than an event had high impact on the political figure. The particular value for the quantitative value threshold may be configured specifically for the domain-specific topic, such as by a domain expert or user. In some examples, the RT data module 342 may analyze the quantitative value over time and compare any change in quantitative value to an average over a historical period of time. For example, the RT data module 342 may compare the exchange rate of a currency pair after an event to a daily average exchange rate for the currency pair over some period of time, such as within the last week, within the last month, and/or other time period.

The impact scorer 344 may generate an impact score for an event described by one or more event items. The impact score refers to a metric that indicates a level of impact that an event has on a domain-specific topic. For example, the impact score may measure the impact of an event on a currency pair. In a particular example, the impact score may be a number of standard deviations away from prior average standard deviations. In some examples, an impact score that is less than −1.5 or greater than 1.5 may be considered impactful. Other ranges or thresholds may be configured as well.

The AI-based impact classifier 346 may determine whether an event described by one or more event items (which may be filtered and/or clustered) will have an impact on a domain-specific topic. For example, the AI-based impact classifier 346 may determine whether a given event described in a filtered and/or clustered event item will have an impact on an exchange rate between a currency pair. To do so, the AI-based impact classifier 346 may use an impact model 325 trained via an impact training corpus, which may be stored in the impact training datastore 141. The impact model 325 may be trained based on one or more model features 327 (illustrated as model features 327A-N) that are correlated to impactful events. A specific value of a model feature 327 may be correlated with an outcome to determine the model feature's predictive affinity for the outcome. For example, different values for a given model feature 327 may be determined to be correlative (or not) with the outcome.

Examples of model features 327 may include a geographic origin (such as country of origin) of an event or event item, a quantitative value (such as an exchange rate between a currency pair or an approval rating of a political candidate before and after an impactful event occurred), and/or other data values that may correlate the data values with an outcome. The country of origin may (or may not) be predictive that the corresponding event item will have an impact on the domain-specific topic of interest. For example, an event occurring in a certain country and/or an event item originating from that certain country may be determined to correlate with historical impacts on the domain-specific topic of interest. On the other hand, an event occurring in another country and/or an event item originating from that other country may be determined to not correlate with historical impacts on the domain-specific topic of interest. Put a different way, events occurring in different countries and/or event items from different countries will have different levels of impact (if any) on a given domain-specific topic of interest. The AI-based impact classifier 346 may be trained to learn these different levels of impact. Other examples of model features may be similarly used to train the AI-based impact classifier 346. For example, the AI-based impact classifier 346 may learn the magnitude of price swings in exchange rates for a currency pair that result from impactful events.

The impact training corpus may include event items that describe an event known to have impacted the domain-specific topic. To illustrate, continuing the previous example, the impact model 325 used by the AI-based impact classifier 346 may be trained on a training corpus that includes event items known to have impacted an exchange rate between the currency pair. Thus, the AI-based impact classifier 346 may determine whether a new event described by filtered and/or clustered event items will have an impact on the currency pair. In some examples, the AI-based impact classifier 346 may be a binary classifier (will or will not impact the currency pair in the foregoing example) and/or output a probabilistic outcome indicating a likelihood that the event will impact a domain-specific topic (the currency pair in the foregoing example).

The prior event-based impact quantification subsystem 150 may leverage knowledge about the impact that events historically had on a domain-specific topic of interest to predict the impact than a current event will have on the domain-specific topic of interest. For example, the prior event-based impact quantification subsystem 150 may retrieve event items, which may be stored in prior impactful events datastore 151, that describe events that were historically impactful.

In some examples, when the AI-based impact classifier 346 predicts that an event, which is described by one or more event items, will have an impact on a domain-specific topic, the impact may be quantified. For example, the prior event-based impact quantification subsystem 150 may identify, from among the accessed event items from the prior impactful events datastore 151 one or more event items that are similar to a current event item being analyzed so that the impact of the current event on a domain-specific topic of interest may be predicted based on similar event items and their impact on the domain-specific topic of interest. The similarity between the one or more event items and the current event item(s) may be determined in various ways, such as comparison of word embeddings, similar to the comparison discussed with respect to the word embeddings 227.

In some examples, the prior event-based impact quantification subsystem 150 may determine a similarity between the current event item and the one or more historical event items by modeling the event items using a graph approach. A graph refers to a representation of pairwise relationships between objects. In this case, the prior event-based impact quantification subsystem 150 may generate a graph that represents relationships between words or phrases in event items that describe events. One example of a graph representation that may be used is the WordNet representation, which is a semantic network of words or phrases that may be used for semantic similarity comparisons. For example, the prior event-based impact quantification subsystem 150 may generate a first WordNet graph for a historical event item that is known to have had an impact on a domain-specific topic and a second WordNet graph for a current event item. The prior event-based impact quantification subsystem 150 may determine a level of semantic or other similarity between the first WordNet graph with the second WordNet graph. If the level of similarity is above a threshold value, then the prior event-based impact quantification subsystem 150 may determine that the one or more historical event items represented by the first WordNet graph is similar to the current event item represented by the second WordNet graph.

Based on the determined similarity, the prior event-based impact quantification subsystem 150 may quantify the impact that the current event item will have on the domain-specific topic based on the impact that the historical event item had on the domain-specific topic.

In some examples, such impact may be assessed over a period of time. For example, the impact of the historical event item on the domain-specific topic may be stored as a function of time. In this example, the impact of the historical event item may be stored over a time period, such as a second, a minute, a day, a week, a month, and/or other time period. In an example of a historical news piece about a historical event that impacted a currency pair, the change in the exchange rate after the historical event occurred over one or more seconds, one or more minutes, one or more days, one or more weeks, one or more months, and/or other time period may be stored. Such historical impact over these and/or other time periods may be used to predict the exchange rate between the currency pair over the same time period(s). For example, prior event-based impact quantification subsystem 150 may predict the exchange rate that will occur after a current event that impacts the currency pair is determined. In this example, the prior event-based impact quantification subsystem 150 may predict the exchange rate within one or more seconds, one or more minutes, one or more days, one or more weeks, one or more months, and/or other time period after the current event occurred and/or was reported in a current event item.

In some examples, such prediction may be made over a time series, which may refer to multiple points in time, which each point in time has an associated quantitative value. For example, the time series may include the exchange rate between a currency pair over a time series after an impactful event has occurred so that the impact may be measured over time. In this example, the time series may include the exchange rate five minutes after the impactful event, ten minutes after the impactful event, 30 minutes after the impactful event, one day after the impactful event, one week after the impactful event, one month after the impactful event, and so on. Other points in time may be used as well or instead, and the time series may be configured to end as needed.

Figure 4:
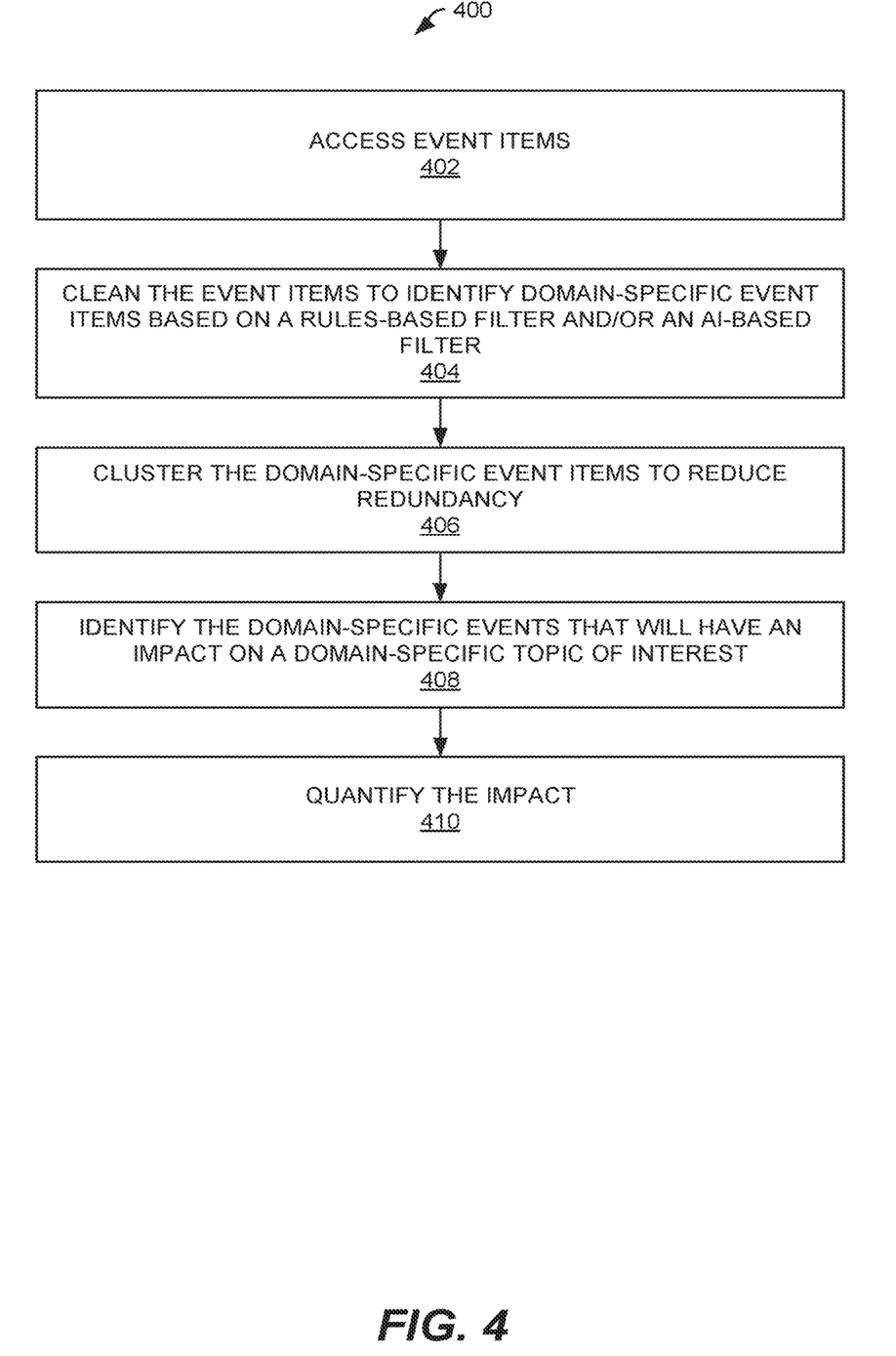
FIG. 4 illustrates an example of a method of determining an impact of events.

FIG. 4 illustrates an example of a method 400 of determining an impact of events. At 402, the method 400 may include accessing a plurality of event items. For example, the event items may be accessed from one or more event sources 101 and/or the event datastore 121. To illustrate, referring to FIG. 6A, the impact of an event from among a listing of events 610 on a price movement 621 of a currency pair may be determined and displayed by the user interface 600A.

At 404, the method 400 may include cleaning the plurality of event items to eliminate event items that do not relate to a domain of interest based on a rules-based filter 122 and/or an artificial intelligence (AI)-based filter 124.

At 406, the method 400 may include clustering the cleaned plurality of event items into groups of event items based on a measure of content similarity among the event items, each group of event items relating to a respective event. For example, the event clustering subsystem 130 may cluster the cleaned plurality of event items based on similarity among the content of the event items.

At 408, the method 400 may include, for each group of event items, determining whether the respective event will impact a corresponding domain-specific topic in the domain of interest. For example, the impact analysis subsystem 140 may determine whether a group of clustered event items describe an event that will have an impact on the domain-specific topic.

At 410, the method 400 may include quantifying the impact that each respective event will have on the corresponding domain-specific topic. For example, the prior event-based impact quantification subsystem 150 may quantify the predicted impact based on the similarity between each respective event and prior events being known to be impactful to the corresponding domain-specific topic.

Figure 5:
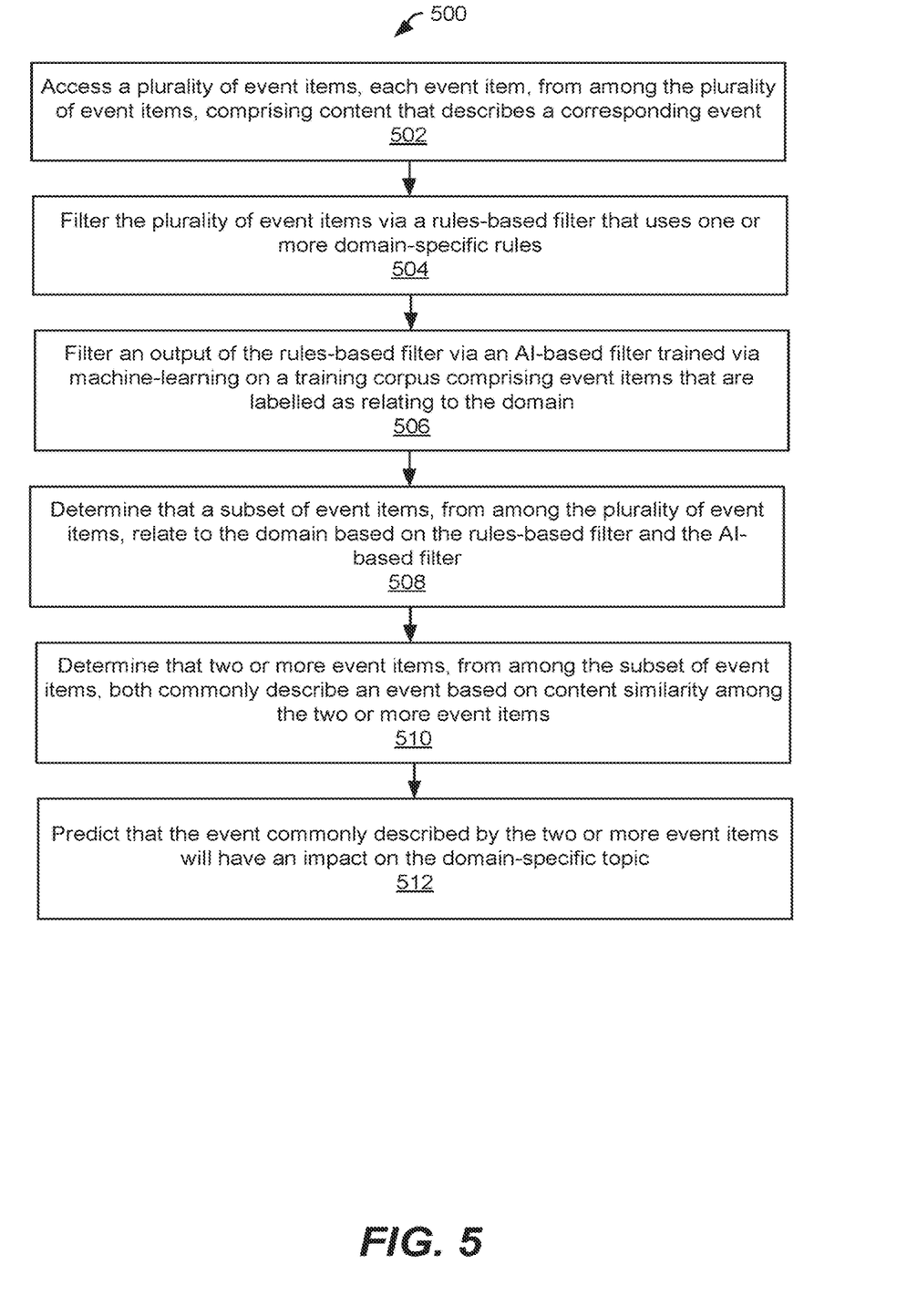
FIG. 5 illustrates another example of a method of determining an impact of events.

FIG. 5 illustrates another example of a method 500 of determining an impact of events. Referring again to FIG. 6A, an impact (such as price movement 621) of an event from among a listing of events 610 may be determined. At 502, the method 500 may include accessing a plurality of event items, each event item, from among the plurality of event items, comprising content that describes a corresponding event. In some examples, the event items may be provided by one or more event sources 101. In some examples, the event items may be accessed from an event datastore 121.

At 504, the method 500 may include filtering the plurality of event items via a rules-based filter that uses one or more domain-specific rules, each domain-specific rule comprising a parameter used to identify event items that relate to a domain.

At 506, the method 500 may include filtering an output of the rules-based filter via an AI-based filter trained via machine-learning on a training corpus comprising event items that are labelled as relating to the domain. It should be noted that the AI-based filter may filter the plurality of event items independently of the rules-based filter in other examples.

At 508, the method 500 may include determining that a subset of event items, from among the plurality of event items, relate to the domain based on the rules-based filter and the AI-based filter.

At 510, the method 500 may include determining, by the processor, that two or more event items, from among the subset of event items, both commonly describe an event-based on content similarity among the two or more event items. The term "commonly describe" means that the two or more event items describe the same event, such as when two news stories report on the same event. An example implementation of determining such common description is described with respect to the event clustering subsystem 130, which may cluster the subset of event items into clusters, where each cluster includes event items having content similar to other event items in that cluster. As such, each cluster may relate to a respective event described by event items in that cluster.

At 512, the method 500 may include predicting that the event commonly described by the two or more event items will have an impact on the domain-specific topic.

FIG. 6A illustrates an example of a user interface 600A for displaying event impacts. In this example, the time series of impact of events over time is displayed along with a listing of events 610 that, when selected, provides a detailed view of the event. The listing of events 610 may include news headlines, economic data announcements and commodity price moves, and/or other events that have an impact on currency markets. Also in this example, the user interface 600A may include a graph 620 that shows the impact (price movement 621) of events on a currency pair, although the interfaces may be configured to display impact data on other domain-specific topics.

The user interface 600A may include a graph 630 that shows volume changes 631, volatility changes 633 and spread changes 635 are tracked on the graph 630 using the z-score. The graph 630 shows the standard deviation (z-score) of each metric every min v the average of the last 5 trading days—which provides a measure of how unusual the activity was vs the past week.

In some examples, referring to FIG. 6B, the UI subsystem 160 may generate an interface 600B that includes graphs

640, 650, and 660. Graphs 640, 650, and 660 each shows a comparison of the impact of selected events 601A and 601B. In this manner, the impact of an event 601A and event 601B (and/or other selected events) is displayed. In some examples, the comparison may be made between a current event and one or more past similar events. The compared events may be analyzed for N hours, where N is an integer such as six. The graph may display, for each of price return (graph 640), volatility (graph 660), volume (graph 650), an average for the previous time period such as one week and comparing it to the average for each metric for the current event over the last recent time period such as five minutes to understand how many standard deviations the current event is from the average. The higher z-score (positive or negative) may indicate abnormal market action associated with the event (and therefore that the event is impactful).

FIG. 6B illustrates another example of a user interface 600B for displaying event impacts. In this example, the time series of impact of economic announcements (such as US nonfarm payrolls) over time is displayed along with a listing of economic announcements that, when selected, provides a detailed view of the economic announcements. Also in this example, the impact (price movement) of economic announcements on a currency pair is displayed. It should be noted that economic announcements may be considered to be an event in that economic announcements may be assessed using the intelligent impact computer system 110. However, because of the regularity of the economic announcements as opposed to spontaneous nature of events such as breaking news stories, the behavior of the impact of economic announcements may be modeled differently than the behavior of other types of events.

Figure 7:
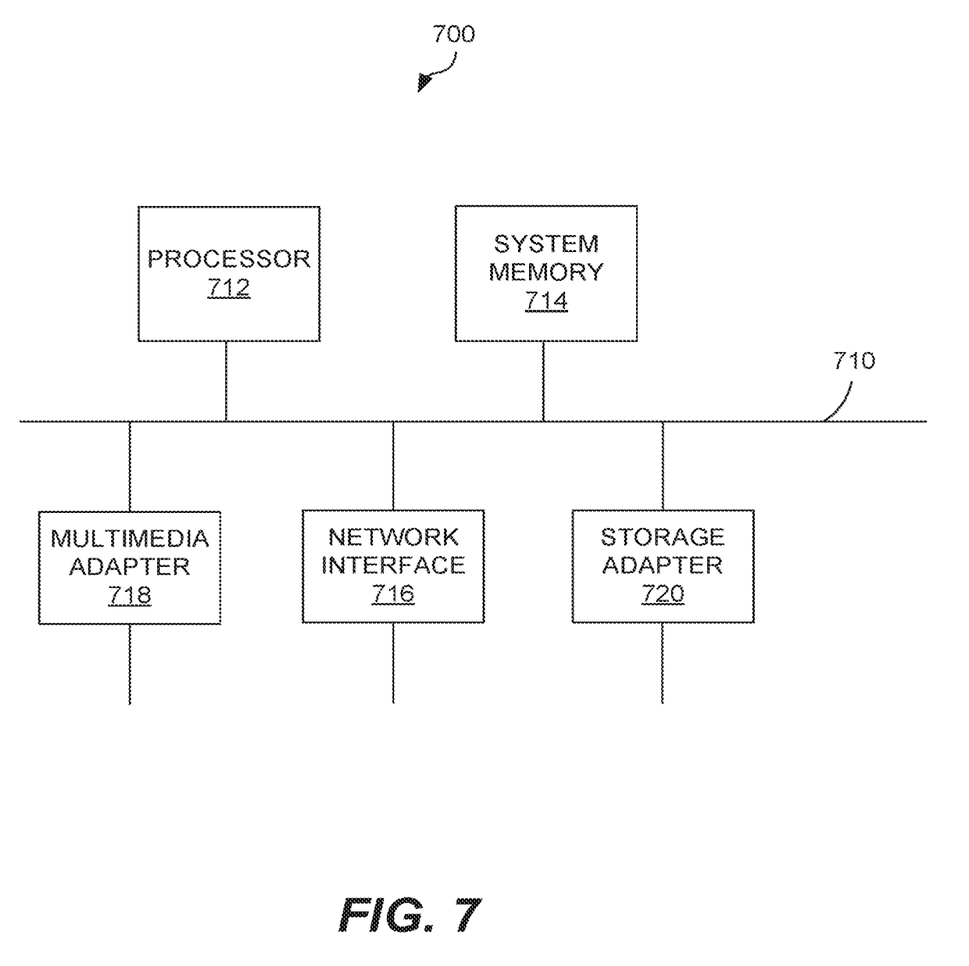
FIG. 7 illustrates an example of a computer system that implements the electronic surveillance system illustrated in FIG. 1.

FIG. 7 illustrates an example of a computer system 700 that implements the intelligent impact computer system 110 illustrated in FIG. 1. The computer system 700 may include, among other things, an interconnect 710, a processor 712, a multimedia adapter 718, a network interface 716, a system memory 714, and a storage adapter 720.

The interconnect 710 may interconnect various subsystems, elements, and/or components of the computer system 700. As shown, the interconnect 710 may be an abstraction that may represent any one or more separate physical buses, point-to-point connections, or both, connected by appropriate bridges, adapters, or controllers. In some examples, the interconnect 710 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1364 bus, or "firewire," or other similar interconnection element.

In some examples, the interconnect 710 may allow data communication between the processor 712 and system memory 714, which may include read-only memory (ROM) or flash memory (neither shown), random-access memory (RAM), and/or other non-transitory computer readable media (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 712 may control operations of the computer system 700. In some examples, the processor 712 may do so by executing instructions such as software or firmware stored in system memory 714 or other data via the storage adapter 720. In some examples, the processor 712 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 718 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 716 may provide the computer system 700 with an ability to communicate with a variety of remote devices over a network. The network interface 716 may include, for example, an Ethernet adapter, a Fibre Channel adapter, and/or other wired- or wireless-enabled adapter. The network interface 716 may provide a direct or indirect connection from one network element to another, and facilitate communication and between various network elements.

The storage adapter 720 may connect to a standard computer readable medium for storage and/or retrieval of information, such as a fixed disk drive (internal or external). The stored information may include instructions that program the processor 712. Such instructions may include various components illustrated in FIG. 1, such as the various subsystems 120-160.

Other devices, components, elements, or subsystems (not illustrated) may be connected in a similar manner to the interconnect 710 or via a network. The network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The devices and subsystems can be interconnected in different ways from that shown in FIG. 7. Instructions to implement various examples and implementations described herein may be stored in computer-readable storage media such as one or more of system memory 714 or other storage. Instructions to implement the present disclosure may also be received via one or more interfaces and stored in memory. The operating system provided on computer system 700 may be MS-DOS®, MS-WINDOWS®, OS/2®, OS X®, IOS®, ANDROID®, UNIX®, Linux®, or another operating system.

It should be noted that throughout the disclosure, discussion of various measures content similarity such as text similarity through word embeddings 227 and graph analysis may be interchangeable and/or combined. For example, in addition to or instead of using word embeddings 227 for text similarity, graph analysis may be used and vice versa.

The datastores illustrated herein (such as 121, 123, 125, 141, 151) may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions.

The database may store a plurality of types of data and/or files and associated data or file descriptions, administrative information, or any other data. The various databases may store predefined and/or customized data described herein.

In FIG. 1 as well as in other drawing Figures, different numbers of entities than those depicted may be used. Furthermore, according to various implementations, the components described herein may be implemented in hardware and/or software that configure hardware.

For simplicity and illustrative purposes, the disclosure included descriptions that may refer to examples. In the description, numerous specific details have been set forth in object to provide a thorough understanding of the present disclosure. It will be readily apparent however, that the disclosure may be practiced without limitation to these specific details. In other instances, some methods and structures have not been described in detail so as not to unnecessarily obscure the present disclosure. In some instances, various method operations may be omitted and the various method operations are not necessarily performed in the object in which they are presented. It should be understood that the various method operations may be performed by some or all of the features described with reference to FIG. 1.

Throughout the disclosure, the term "a" and "an" may be intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A method of assessing an impact of events in a domain of interest over time, comprising:
   accessing, by a processor, a plurality of event items, each event item, from among the plurality of event items, comprising content that describes a corresponding event;
   identifying, by the processor, for at least a first event item from among the plurality of event items, an event source of the first event item and a type of domain content that the event source provides;
   filtering, by the processor, the plurality of event items via a rules-based filter that uses one or more domain-specific rules, the one or more domain-specific rules comprising at least a first domain-specific rule that filters in or out content based on whether or not the domain of interest matches the type of domain content that the event source provides;
   filtering, by the processor, an output of the rules-based filter via an artificial intelligence (AI)-based filter trained via machine-learning on a training corpus comprising event items that are labelled as relating to the domain;
   determining, by the processor, that a subset of event items, from among the plurality of event items, relate to the domain based on the rules-based filter and the AI-based filter;
   determining, by the processor, that two or more event items, from among the subset of event items, both commonly describe an event-based on content similarity among the two or more event items; and
   predicting, by the processor, that the event commonly described by the two or more event items will have an impact on a domain-specific topic.

2. The method of claim 1, wherein the one or more domain-specific rules include a domain-specific rule that specifies a tag value for filtering, and wherein filtering the plurality of event items via the rules-based filter comprises:
   extracting a metadata tag included in a tagged event item, from among the plurality of event items, wherein the tag indicates a corresponding domain to which the tagged event item relates; and
   filtering in or out the tagged event item based on the tag and the tag value specified by the domain-specific rule.

3. The method of claim 1, the method further comprising:
   generating a word embedding for each event item in the output of rules-based filter, the word embedding being based on natural language text of each event item in the output of rules-based filter;
   generating a word embedding for each item in the training corpus; and
   filtering the output of the rules-based filter based on a comparison of the word embedding for each event item in the output of rules-based filter and the word embedding for each item in the training corpus.

4. The method of claim 1, wherein determining that two or more event items, from among the subset of event items, describe the same event-based on content similarity among the two or more event items comprises:
   generating a word embedding for each event item from among the two or more event items, each word embedding being based on natural language text of each event item from among the two or more event items; and
   comparing the word embeddings for the two or more event items.

5. The method of claim 1, wherein predicting that the event commonly described by the two or more event items will have an impact on the domain-specific topic comprises:
   providing a plurality of feature values as an input to an AI-based impact classifier trained to correlate the plurality of feature values with various impacts on domain-specific topic.

6. The method of claim 5, wherein the plurality of feature values comprise:
   a geographic origin of the event and/or the quantitative value of the domain-specific topic.

7. The method of claim 1, wherein predicting that the event commonly described by the two or more event items will have an impact on the domain-specific topic comprises:
   generating an impact score that measures an impact of the event on the domain-specific topic, wherein the impact score is a number of standard deviations away from prior average standard deviations; and
   comparing the impact score to a threshold value or range of values.

8. The method of claim 1, wherein predicting that the event commonly described by the two or more event items will have an impact on the domain-specific topic comprises:
   performing a check on one or more real-time data of the event;

comparing the real-time data to one or more real-time data threshold checks; and adjusting the impact score based on the comparison.

9. The method of claim 8, wherein the one or more real-time data threshold checks comprises: a cluster size threshold check that specifies a minimum number of event items that describe the same event.

10. The method of claim 8, wherein the one or more real-time data threshold checks comprises: a quantitative value threshold check that requires a minimum movement in the quantitative value.

11. The method of claim 1, further comprising:

accessing event items from a prior impactful events datastore, wherein each of the event items from the prior impactful events datastore is known to have impacted the domain-specific topic;

determining that content of the two or more event items is similar to content of at least one of the event items from the prior impactful events datastore; and quantifying the impact that the event will have on the domain-specific topic based on the determination that the content of the two or more event items is similar to the content of the at least one of the event items from the prior impactful events datastore.

12. The method of claim 11, wherein quantifying the impact comprising:

generating a time series of quantitative values after the event-based on the historic impact of the at least one of the event items from the prior impactful events datastore.

13. A system, comprising:

a processor programmed to:

access a plurality of event items, each event item, from among the plurality of event items, comprising content that describes a corresponding event;

identify, for at least a first event item from among the plurality of event items, an event source of the first event item and a type of domain content that the event source provides;

filter the plurality of event items via a rules-based filter that uses one or more domain-specific rules, the one or more domain-specific rules comprising at least a first domain-specific rule that filters in or out content based on whether or not the domain of interest matches the type of domain content that the event source provides;

filter an output of the rules-based filter via an artificial intelligence (AI)-based filter trained via machine-learning on a training corpus comprising event items that are labelled as relating to the domain;

determine that a subset of event items, from among the plurality of event items, relate to the domain based on the rules-based filter and the AI-based filter;

determine that two or more event items, from among the subset of event items, both commonly describe an event-based on content similarity among the two or more event items; and predict that the event commonly described by the two or more event items will have an impact on a domain-specific topic.

14. The system of claim 13, wherein the one or more domain-specific rules include a domain-specific rule that specifies a tag value for filtering, and wherein to filter the plurality of event items via the rules-based filter, the processor is further programmed to:

extract a metadata tag included in a tagged event item, from among the plurality of event items, wherein the tag indicates a corresponding domain to which the tagged event item relates; and filter in or out the tagged event item based on the tag and the tag value specified by the domain-specific rule.

15. The system of claim 13, wherein the processor is further programmed to:

generate a word embedding for each event item in the output of rules-based filter, the word embedding being based on natural language text of each event item in the output of rules-based filter;

generate a word embedding for each item in the training corpus; and filter the output of the rules-based filter based on a comparison of the word embedding for each event item in the output of rules-based filter and the word embedding for each item in the training corpus.

16. The system of claim 13, wherein to determine that two or more event items, from among the subset of event items, describe the same event-based on content similarity among the two or more event items, the processor is further programmed to:

generate a word embedding for each event item from among the two or more event items, each word embedding being based on natural language text of each event item from among the two or more event items; and compare the word embeddings for the two or more event items.

17. The system of claim 13, wherein to predict that the event commonly described by the two or more event items will have an impact on the domain-specific topic, and wherein the processor is further programmed to:

provide a plurality of feature values as an input to an AI-based impact classifier trained to correlate the plurality of feature values with various impacts on domain-specific topic.

18. The system of claim 17, wherein the plurality of feature values comprise:

a geographic origin of the event and/or the quantitative value of the domain-specific topic.

19. The system of claim 13, wherein the processor is further programmed to:

access event items from a prior impactful events datastore, wherein each of the event items from the prior impactful events datastore is known to have impacted the domain-specific topic;

determine that content of the two or more event items is similar to content of at least one of the event items from the prior impactful events datastore; and quantify the impact that the event will have on the domain-specific topic based on the determination that the content of the two or more event items is similar to the content of the at least one of the event items from the prior impactful events datastore.

* * * * *